United States Patent
Tseng et al.

(10) Patent No.: US 11,047,985 B2
(45) Date of Patent: Jun. 29, 2021

(54) OPTICAL BASE STATION

(71) Applicant: HTC Corporation, Taoyuan (TW)

(72) Inventors: Jian-Zhi Tseng, Taoyuan (TW); Shuo-Chieh Kan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 345 days.

(21) Appl. No.: 15/981,901

(22) Filed: May 17, 2018

(65) Prior Publication Data

US 2019/0079191 A1  Mar. 14, 2019

Related U.S. Application Data

(60) Provisional application No. 62/557,091, filed on Sep. 11, 2017.

(51) Int. Cl.
| | |
|---|---|
| *G01S 17/88* | (2006.01) |
| *G01S 17/48* | (2006.01) |
| *G01S 17/66* | (2006.01) |
| *G02B 26/08* | (2006.01) |
| *G02B 26/10* | (2006.01) |

(52) U.S. Cl.
CPC .............. *G01S 17/88* (2013.01); *G01S 17/48* (2013.01); *G01S 17/66* (2013.01); *G02B 26/0833* (2013.01); *G02B 26/105* (2013.01)

(58) Field of Classification Search
CPC .................................. G01S 17/58; G01S 17/42
See application file for complete search history.

(56) References Cited

U.S. PATENT DOCUMENTS

| 2011/0128602 A1 | 6/2011 | Hamano et al. | |
|---|---|---|---|
| 2016/0131761 A1* | 5/2016 | Yates | G01S 7/481 356/3.11 |
| 2017/0314759 A1* | 11/2017 | Nykerk | F21S 43/26 |

FOREIGN PATENT DOCUMENTS

| CN | 102105831 | 6/2011 |
|---|---|---|
| CN | 102365573 | 2/2012 |
| CN | 102902062 | 1/2013 |
| CN | 104181691 | 12/2014 |
| CN | 104395813 | 3/2015 |
| CN | 105824004 | 8/2016 |
| CN | 205581291 | 9/2016 |
| CN | 106054377 | * 10/2016 |
| EP | 0488046 | 6/1992 |
| EP | 0586804 | 3/1994 |
| EP | 0884128 | 12/1998 |
| JP | H09133887 | 5/1997 |
| JP | 2015125317 | 7/2015 |
| JP | 2016109517 | 6/2016 |
| TW | 201617826 | 5/2016 |

OTHER PUBLICATIONS

Translation for CN 106054377.*

(Continued)

*Primary Examiner* — Luke D Ratcliffe
(74) *Attorney, Agent, or Firm* — JCIPRNET

(57) ABSTRACT

An optical base station including a base, a light source and a first MEMS scanning mirror is provided. The light source is disposed on the base for providing a light beam. The first MEMS scanning mirror is disposed at an optical path of the light beam to reflect the light beam for spatial scanning.

4 Claims, 4 Drawing Sheets

(56) References Cited

OTHER PUBLICATIONS

"Search Report of Europe Counterpart Application", dated Jan. 25, 2019, p. 1-p. 4.
"Optical encoders and LiDAR scanning", retrieved from http://www.renishaw.com/en/optical-encoders-and-lidar-scanning--39244.
"Fujitsu Develops World's First Super-Wide-Angle 3D Laser Radar with a Horizontal and Vertical Range of 140 Degrees", retrieved from http://www.fujitsu.com/global/about/resources/news/press-releases/2012/1029-02.html.
"Optically extended MEMS scanning transforms imaging ladar", retrieved from http://www.laserfocusworld.com/articles/print/volume-41/issue-7/features/scanners/optically-extended-mems-scanning-transforms-imaging-ladar.html.
"Office Action of Taiwan Counterpart Application," dated Dec. 17, 2018 p. 1-p. 4.
"Office Action of Europe Counterpart Application," dated Mar. 11, 2019, p. 1-p. 8.
"Office Action of Europe Counterpart Application", dated Jul. 2, 2020, pp. 1-7.
"Office Action of China Counterpart Application", dated Jul. 31, 2020, p. 1-p. 7.
"Search Report of Europe Counterpart Application", dated Dec. 4, 2020, p. 1-p. 9.
"Office Action of China Counterpart Application", dated Feb. 24, 2021, p. 1-p. 6.

\* cited by examiner

OPTICAL BASE STATION

CROSS-REFERENCE TO RELATED APPLICATION

This application claims the priority benefit of U.S. provisional application Ser. No. 62/557,091, filed on Sep. 11, 2017. The entirety of the above-mentioned patent application is hereby incorporated by reference herein and made a part of this specification.

BACKGROUND

Field of the Disclosure

The disclosure relates to a base station, and particularly relates to an optical base station.

Description of Related Art

With the advancement of science and technology, people desire to enjoy audio and video in a realistic and immersive way, so the virtual reality (VR) system is warmly welcomed in the market. The user wears a virtual reality device to watch three-dimensional image through the virtual reality device and have a good viewing experience. However, in order to construct the correct virtual reality space, optical base station must be used to provide reference orientation in space.

FIG. 1 is a schematic view showing a conventional optical base station. Referring to FIG. 1, in order to perform two-dimensional scanning, a conventional optical base station 200 adopts two rotors 220A and 220B arranged in pair with the two light sources 210A and 210B, respectively. A light beam L20A provided by the light source 210A, after entering the rotor 220A, scans the surrounding space along with the rotation of the rotor 220A. A light beam L20B provided by the light source 210B, after entering the rotor 220B, scans the surrounding space along with the rotation of the rotor 220B and in different directions from the light beam L20A. However, there is an offset between the rotation frequency of the rotor and the scan frequency set in the optical base station and there are issues of gravity and corresponding counterweight when the rotor rotates, so as to cause jitter effect and reduce the scanning accuracy of the conventional optical base station. Otherwise, it is difficult to reduce the volume of the optical base station 200 due to adopting the two rotors 220A and 220B.

SUMMARY

The disclosure provides an optical base station, capable of reducing jitter effect.

An optical base station of the disclosure includes a base, a light source and a first microelectromechanical systems (MEMS) scanning mirror is provided. The light source is disposed on the base for providing a light beam. The first MEMS scanning mirror is disposed at an optical path of the light beam, and configured to reflect the light beam for spatial scanning.

Based on the above, in the optical base station of the disclosure, the MEMS scanning mirror is adopted to replace the rotor, so the optical base station has a smaller jitter effect so as to improve optical scanning accuracy.

In order to make the aforementioned and other features and advantages of the disclosure more comprehensible, embodiments accompanying figures are described in detail belows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
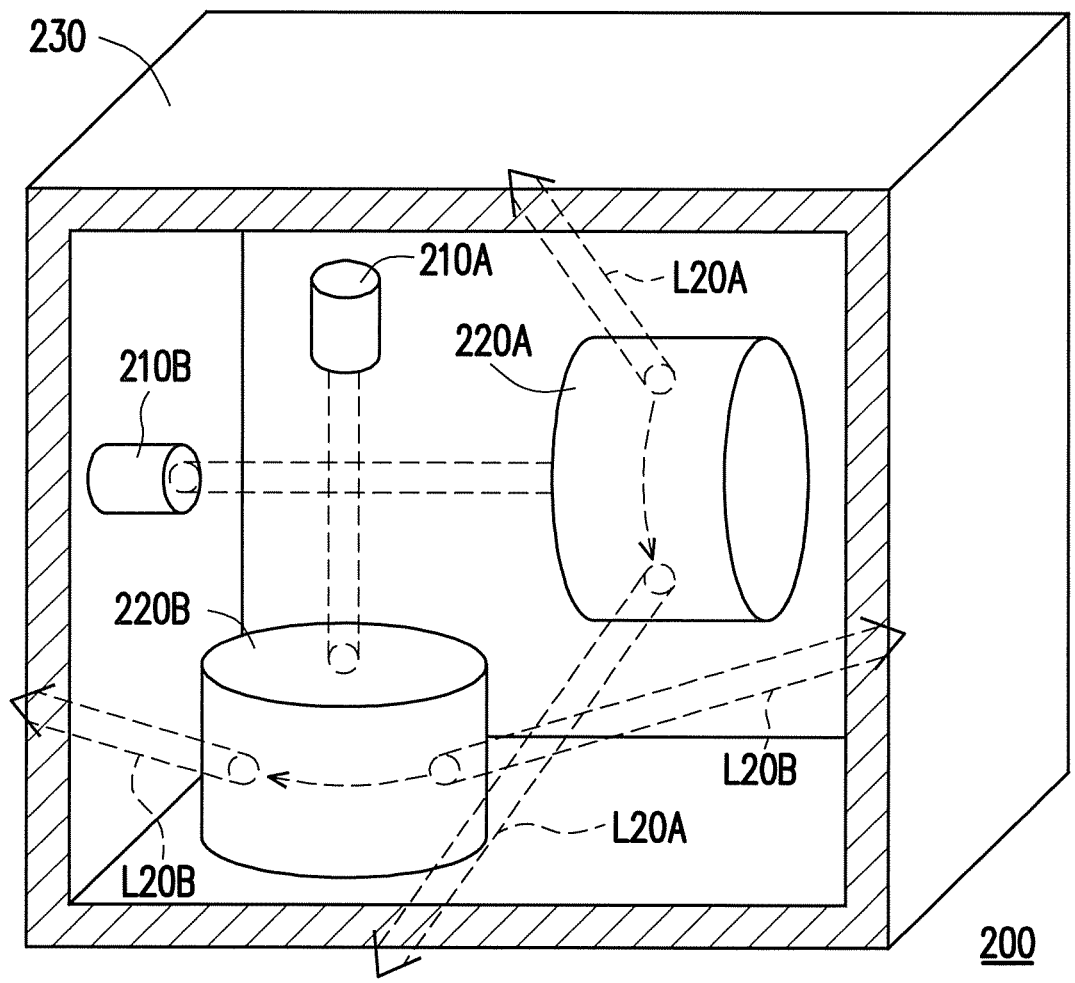
FIG. 1 is a schematic view showing a conventional optical base station.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
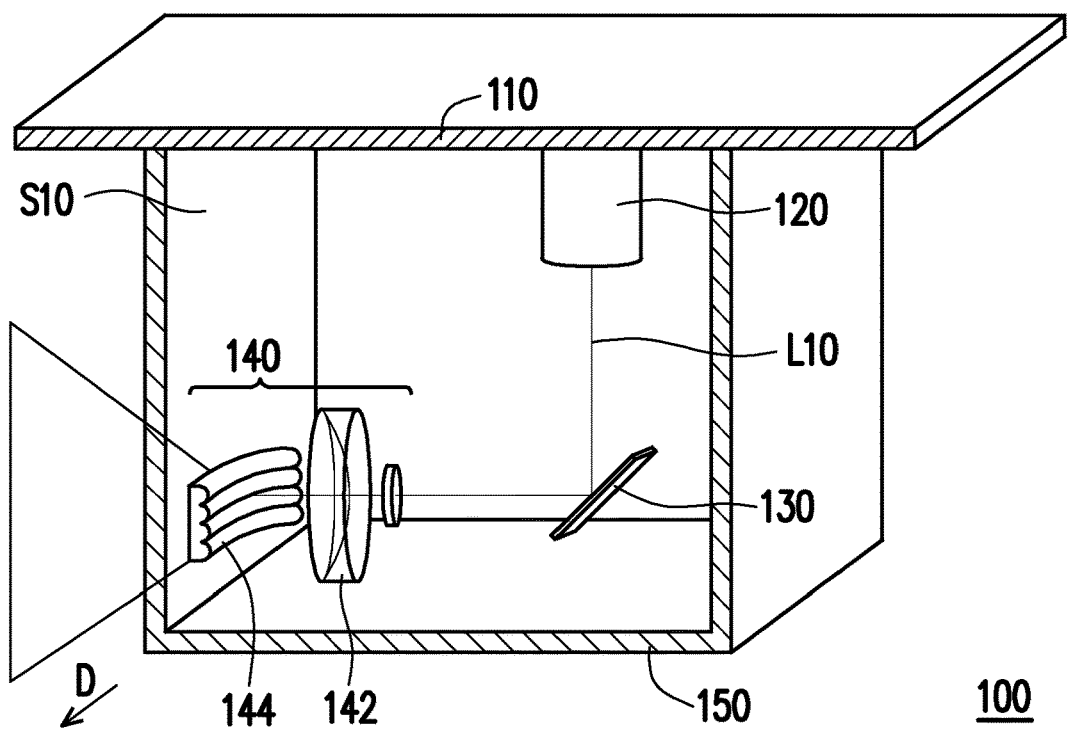
FIG. 2 is a schematic view illustrating an optical base station according to an embodiment of the invention.
Figure 3:
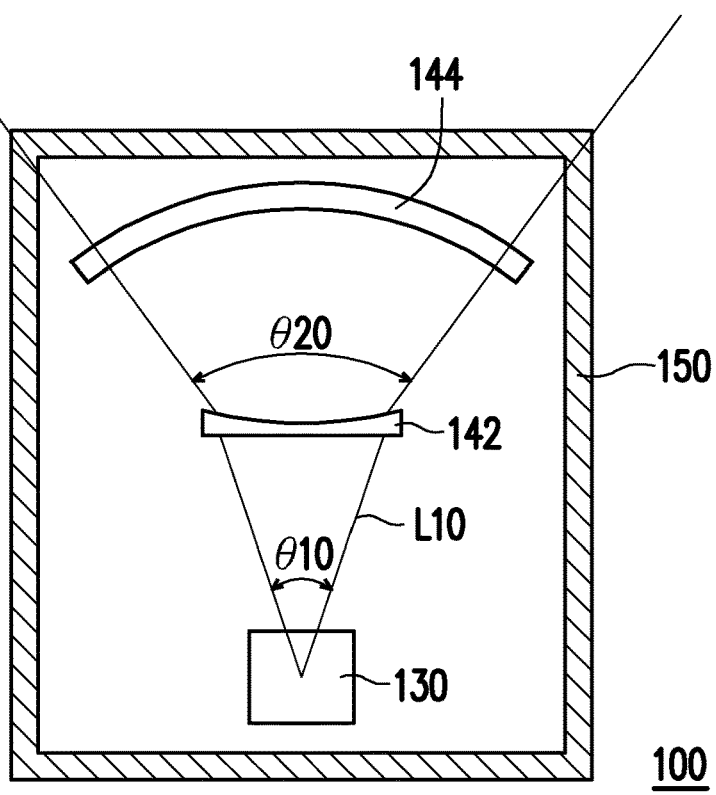
FIG. 3 is a schematic view illustrating some components of an optical base station according to an embodiment of the invention.

FIG. 2 is a schematic view illustrating an optical base station according to an embodiment of the invention, FIG. 3 is a schematic view illustrating some components of the optical base station according to the embodiment of the invention. Referring to FIG. 2 and FIG. 3, an optical base station 100 of the present embodiment includes a base 110, a light source 120 and a first MEMS scanning mirror 130. The light source 120 is disposed on the base 110 for providing a light beam L10. The first MEMS scanning mirror 130 is disposed on an optical path of the light beam L10, is configured to reflect the light beam L10 so that the light beam L10 performs spatial scanning. For example, a light spot of the light beam L10 moves back and forth within a scanning angle θ10. In the present embodiment, the first MEMS scanning mirror 130 is a MEMS scanning mirror having a single axis of rotation. In other embodiments, the first MEMS scanning mirror 130 may also be a MEMS scanning mirror having multiple axes of rotation, but the disclosure is not limited thereto. Otherwise, the mirror of the first MEMS scanning mirror 130 may be formed by a single lens or an array of multiple lenses according to requirements. In the present embodiment, the mirror of the first MEMS scanning mirror 130 is formed by a single lens, but the disclosure is not limited thereto.

In the optical base station 100 of the present embodiment, the first MEMS scanning mirror 130 replaces the rotor in the conventional art. The first MEMS scanning mirror 130 is able to oscillate the mirror by using electromagnetic effect. When the light beam L10 illuminates the first MEMS scanning mirror 130, along with the oscillation of the first MEMS scanning mirror 130, the light beam L10 reflected by the first MEMS scanning mirror 130 also oscillates. Therefore, the first MEMS scanning mirror 130 can achieve the same effect of moving the light beam as the rotor.

The oscillation of the first MEMS scanning mirror 130 is accurately controlled by the control system, and the weight of the first MEMS scanning mirror 130 is much lighter than the weight of the rotor in conventional art. Therefore, compared to the conventional art, the scanning accuracy of the optical base station 100 in the present embodiment is not affected due to the jitter effect. Accordingly, the optical base station 100 of the present embodiment can provide accurate optical scan results. In addition, the MEMS scanning mirror has a smaller volume than the rotor, so the internal space required in the optical base station 100 is also smaller, so as to reduce the overall volume and to meet consumer preference.

In the present embodiment, the optical base station 100 may further include a cover 150 disposed on the base 110. The light source 120 and the first MEMS scanning mirror 130 are located in an accommodating space S10 formed by the cover 150 and the base 110. The cover 150 may isolate the light source 120 and the first MEMS scanning mirror 130 from the outside, so as to prevent from interfering and polluting caused by foreign objects in order to increase reliability and prolong service life of the optical base station 100. The cover 150 is transparent to the light beam L10. Furthermore, the term "transparent" means that the light beam L10 is not shielded by the cover 150 and is able to transmit out of the cover 150, and the light intensity of the light beam L10 is essentially not weakened. However, the human eye may not be able to see inside of the cover 150 from the outer side of the cover 150. In other words, it is not important whether the cover 150 is transparent to the human eye or not, the important thing is that the material of the cover 150 allows the wave band of the light beam L10 to pass through and does not obstruct the light beam L10 or does not significantly weaken the intensity of the light beam L10. Moreover, in the present embodiment, the whole of the cover 150 may be transparent, or a part of the cover 150 that the optical path of the light beam L10 passes through is transparent.

In the present embodiment, the optical base station 100 may further include a lens module 140 disposed on the optical path of the light beam L10. After being outputted from the light source 120, the light spot of the light beam L10 originally has, for example, a dot shape, and the light beam L10 is converted by the lens module 140 to have linear light spot to perform optical scanning. The meaning of the light beam L10 having linear light spot is that, when the light beam L10 is projected on a plane perpendicular to the light beam 10, the shape of the light spot on the plane is approximately a linear shape. The lens module 140 of the present embodiment includes a divergent lens 142 and a lenticular lens sheet 144, but the disclosure is not limited thereto. The divergent lens 142 is a circular lens in the present embodiment. In other embodiments, since the region that the light beam L10 actually passes through on the divergent lens 142 is a long strip, so that the divergent lens 142 may also be a corresponding rectangular lens, in order to reduce the volume of the divergent lens 142.

Referring to FIG. 3, in the present embodiment, the scanning scope of the optical base station 100 is the passing area of the light beam L10 along the optical path after the light beam L10 is reflected by the oscillating first MEMS scanning mirror 130. The light beam L10 is reflected by the oscillating first MEMS scanning mirror 130 and is reflected to different locations according to the oscillation of the first MEMS scanning mirror 130. The oscillating angle of the mirror of the first MEMS scanning mirror 130 is limited. In order to further increase the scanning scope, the divergent lens 142 may be disposed on the optical path of the light beam L10. The divergent lens 142 assists in increasing the scanning angle θ10 to a scanning angle θ20, so as to expand the scanning scope. The divergent lens 142 can completely cover the passing area of the optical path of the light beam L10. In other words, regardless of whether the light beam L10 is reflected by the first MEMS scanning mirror 130 at any angle within the scanning angle θ10, the light beam L10 can always enter the divergent lens 142 and is diverged.

After passing through the divergent lens 142 and is diverged, the light beam L10 enters the lenticular lens sheet 144. The lenticular lens sheet 144 is mainly used to change the shape of the linear spot. For example, the light spot having dot shape is converted to the linear light spot. By properly designing the lenticular lens sheet 144, the light intensity of the light beam L10 at each part on the linear light spot is substantially the same. In the present embodiment, the lenticular lens sheet 144 has an inwardly curved surface facing the first MEMS scanning mirror 130 and a plurality of lenticular lens disposed on the inwardly curved surface curved along a direction D and the lenticular lenses extend in the direction D, so, after being reflected by the first MEMS scanning mirror 130 at any angle, the light beam L10 is always perpendicular to the lenticular lens sheet 144, but the disclosure is not limited thereto.

Figure 4:
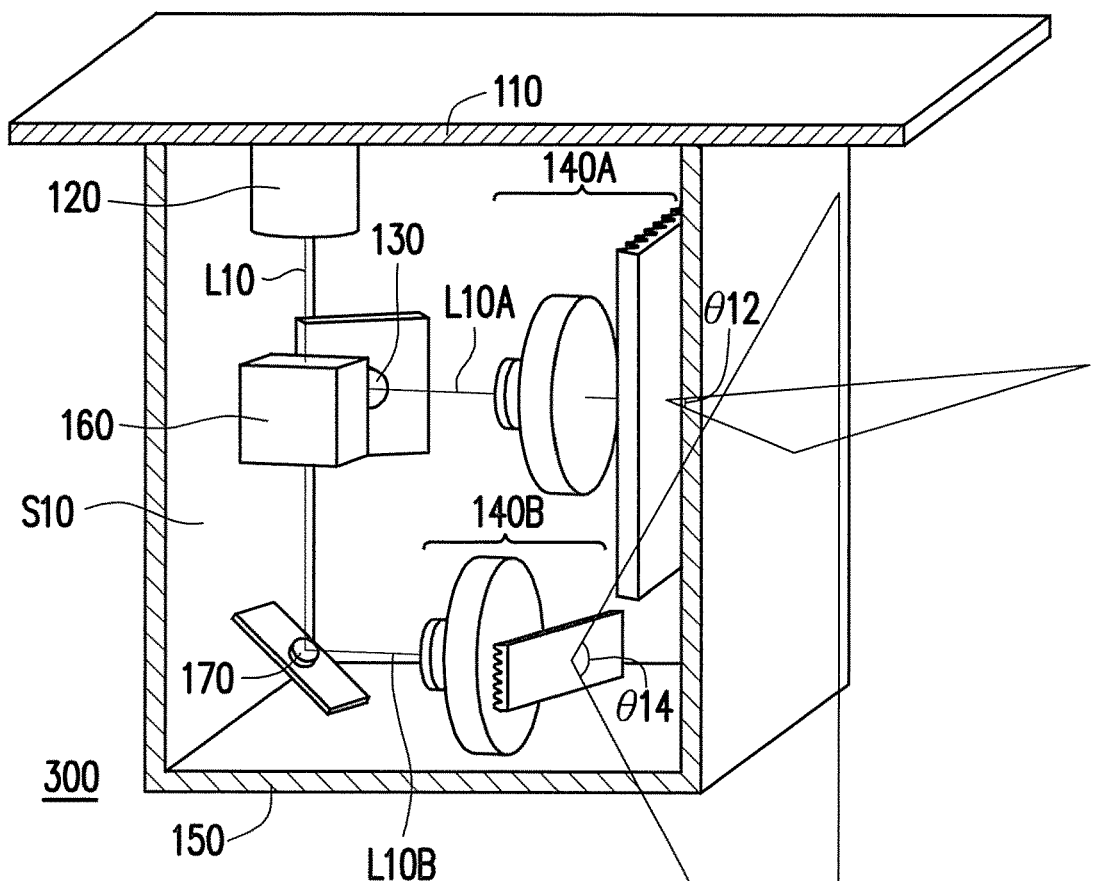
FIG. 4 is a schematic view illustrating an optical base station according to another embodiment of the invention.

FIG. 4 is a schematic view illustrating an optical base station according to another embodiment of the invention. Referring to FIG. 4, an optical base station 300 of the present embodiment and the optical base station 100 in FIG. 2 are similar, only the differences are described below. The optical base station 300 of the present embodiment further include a beam splitter 160 and a second MEMS scanning mirror 170. After entering the beam splitter 160, the light beam L10 is split, and a first sub light beam L10A and a second sub light beam L10B having different directions are outputted. The first MEMS scanning mirror 130 and the second MEMS scanning mirror 170 are respectively disposed on the optical paths of the first sub light beam L10A and the second sub light beam L10B and are oscillated within a first scanning angle θ12 and a second scanning angle θ14, respectively. The first MEMS scanning mirror 130 and the second MEMS scanning mirror 170 respectively rotate about different axes, so, after the first sub light beam L10A and the second sub light beam L10B are reflected, the optical paths of the first sub light beam L10A and the second sub light beam L10B oscillate on two planes that are not parallel to each other. Therefore, the optical base station 300 can use the first sub light beam L10A and the second sub light beam L10B at the same time to optical scan the surroundings in different directions. Along with the distance measurement, the three-dimensional coordinates of an object in space can be constructed.

Figure 5:
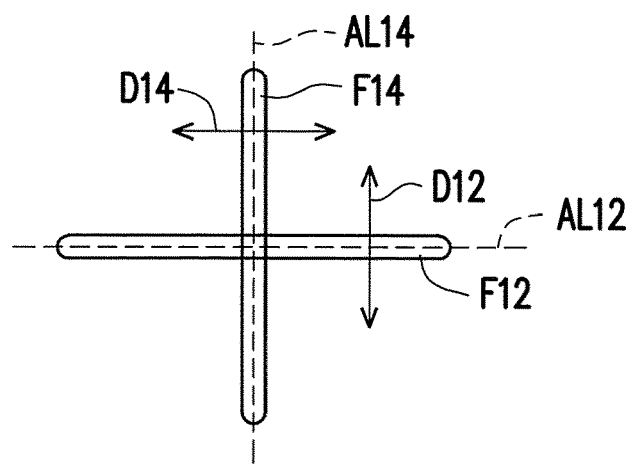
FIG. 5 is a schematic view of a linear light spot in FIG. 4.

FIG. 5 is a schematic view of a linear light spot in FIG. 4. Referring to FIG. 4 and FIG. 5, in the present embodiment, the optical base station 300 may further include a first lens module 140A and a second lens module 140B respectively disposed on optical paths of the first sub light beam L10A and the second sub light beam L10B. The first sub light beam L10A passes through the first lens module 140A and is converted to have a first linear light spot F12, the second sub light beam L10B passes through the second lens module 140B and is converted to have a second linear light spot F14. When the first linear light spot F12 and the second linear light spot F14 are projected onto a wall surface, as shown in FIG. 5, a longitudinal axis AL12 of the first linear light spot F12 and a longitudinal axis AL14 of the second linear light spot F14 are perpendicular to each other. Otherwise, the first linear light spot F12 and the second linear light spot F14 oscillate and move along with the first MEMS scanning mirror 130 and the second MEMS scanning mirror 170, respectively. A moving direction D12 of the first linear light spot F12 and a moving direction D14 of the second linear light spot F14 are perpendicular to each other, but the disclosure is not limited thereto.

When the first MEMS scanning mirror 130 and the second MEMS scanning mirror 170 oscillate and make the first sub light beam L10A and the second sub light beam L10B scan the surrounding space simultaneously, the same optical receiver (not shown) located in the space receives the first sub light beam L10A and the second sub light beam L10B. Since the time difference between the times of receiving the first sub light beam L10A and the second sub light beam L10B may be used to calculate the distance between the optical receiver and the optical base station 300, and the angles of incidence of the first sub light beam L10A and the second sub light beam L10B may be used to determine the orientation of the optical receiver with respect to the optical base station 300, so as to achieve the purpose of three-dimensionally positioning the optical receiver. Therefore, the first MEMS scanning mirror 130 and the second MEMS scanning mirror 170 of the optical base station 300 in the present embodiment replace the two rotors 220A and 220B of the conventional art (as shown in FIG. 1) to scan two-dimensionally in space, to greatly save the space occupied by the components and to greatly save material so as to greatly reduce the cost.

Figure 6:
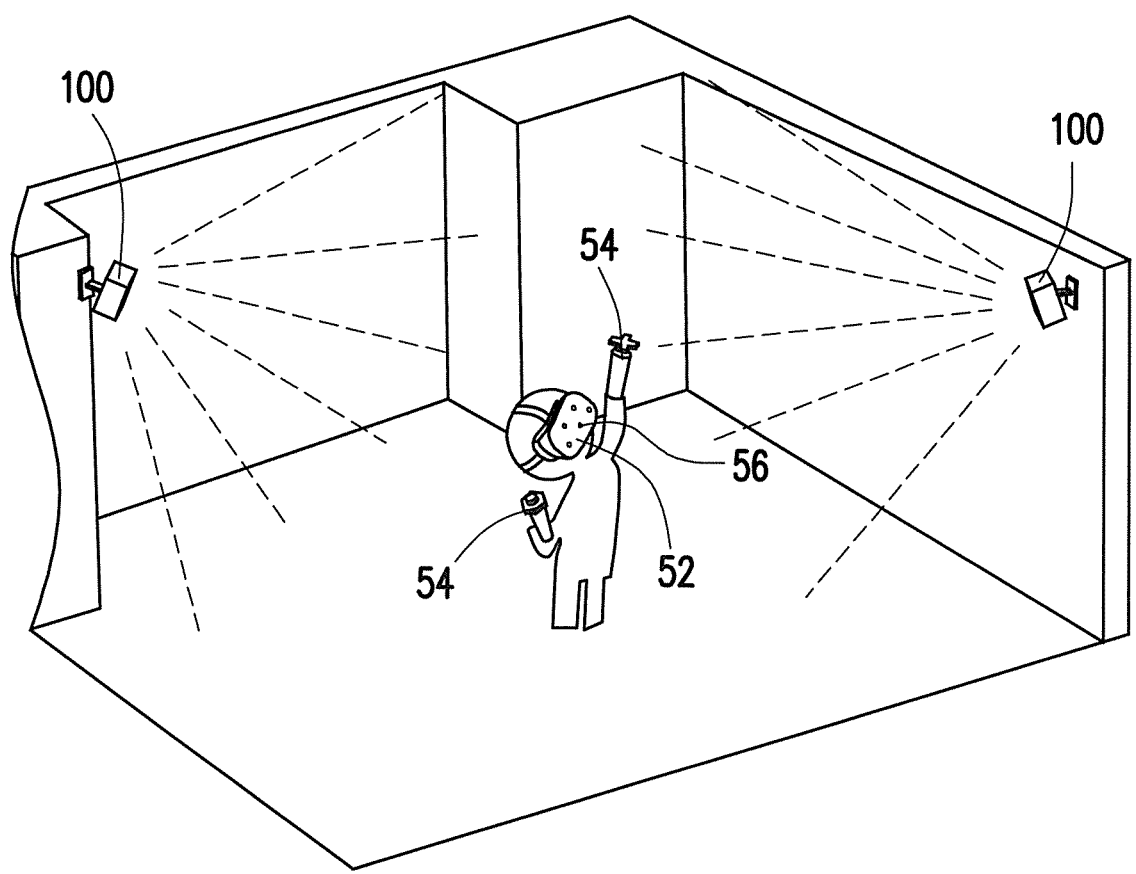
FIG. 6 is a schematic view showing an application architecture of the optical base station in FIG. 2.

FIG. 6 is a schematic view showing an application architecture of the optical base station in FIG. 2. Referring to FIG. 6, the application architecture includes two optical base stations 100 shown in FIG. 2. When the user wears a head-mounted display device 52 and holds a control handle 54 in each of the two hands, the optical base stations 100 continuously and periodically emit the light beam to the space that the user is located in. The head-mounted display device 52 and the control handle 54 have a plurality of optical sensors 56 thereon, only the optical sensors 56 on the head-mounted display device 52 are shown in FIG. 6. The optical sensors 56 can detect the light beam emitted from the optical base stations 100. The information about the time that the light beam is detected by the optical sensors 56 and the geometric positions of the control handle 54 and the optical sensors 56 on the head-mounted display device 52 are analyzed to obtain real-time position information of the head-mounted display device 52 and the control handle 54 in the space, so as to provide the user with various virtual reality applications.

In summary, the MEMS scanning mirror of the optical base station in the disclosure can achieve the same effect of moving the light beam as the rotor. Compared to the rotor in the conventional art, the MEMS scanning mirror has a much smaller size and has a smaller number of parts, so as to reduce manufacturing tolerance and assembly tolerance, which cause control error. Therefore, the optical base station of the disclosure has a smaller jitter effect so as to improve optical scanning accuracy. Otherwise, compared to the rotor in the conventional art, the disclosure adopts MEMS scanning mirror having smaller power consumption. When the optical base station of the disclosure has a built-in battery, it is more convenient to carry the optical base station of the disclosure, and there is no need for external power cable.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An optical base station, comprising:
a base;
a light source, disposed on the base, and configured to provide a light beam;
a first MEMS scanning mirror, disposed at an optical path of the light beam, and configured to reflect the light beam for spatial scanning; and
a lens module, disposed on the optical path of the light beam, the lens module includes a lenticular lens sheet and a divergent lens, the lenticular lens sheet has an inwardly curved surface facing the first MEMS scanning mirror and a plurality of lenticular lens disposed on the inwardly curved surface, the inwardly curved surface is curved along a direction and the lenticular lenses extend in the direction, wherein the light beam, after being reflected by the first MEMS scanning mirror, is converted by the lens module to have a linear light spot.

2. The optical base station as recited in claim 1, further comprising a beam splitter and a second MEMS scanning mirror, wherein the light beam, after passing the beam splitter, is split into a first sub light beam and a second sub light beam, the first MEMS scanning mirror is disposed on an optical path of the first sub light beam and is configured to reflect the first sub light beam so that the first sub light beam performs spatial scanning, the second MEMS scanning mirror is disposed on an optical path of the second sub light beam and is configured to reflect the second sub light beam so that the second sub light beam performs spatial scanning.

3. The optical base station as recited in claim 2, further comprising a first lens module and a second lens module, respectively disposed on optical paths of the first sub light beam and the second sub light beam, wherein the first sub light beam, after being reflected by the first MEMS scanning mirror, is converted by the first lens module to have a linear light spot, and the second sub light beam, after being reflected by the second MEMS scanning mirror, is converted by the second lens module to have a linear light spot.

4. The optical base station as recited in claim 3, wherein a longitudinal axis of the linear light spot of the first sub light beam is perpendicular to a longitudinal axis of the linear light spot of the second sub light beam.

* * * * *